Patented Sept. 12, 1939

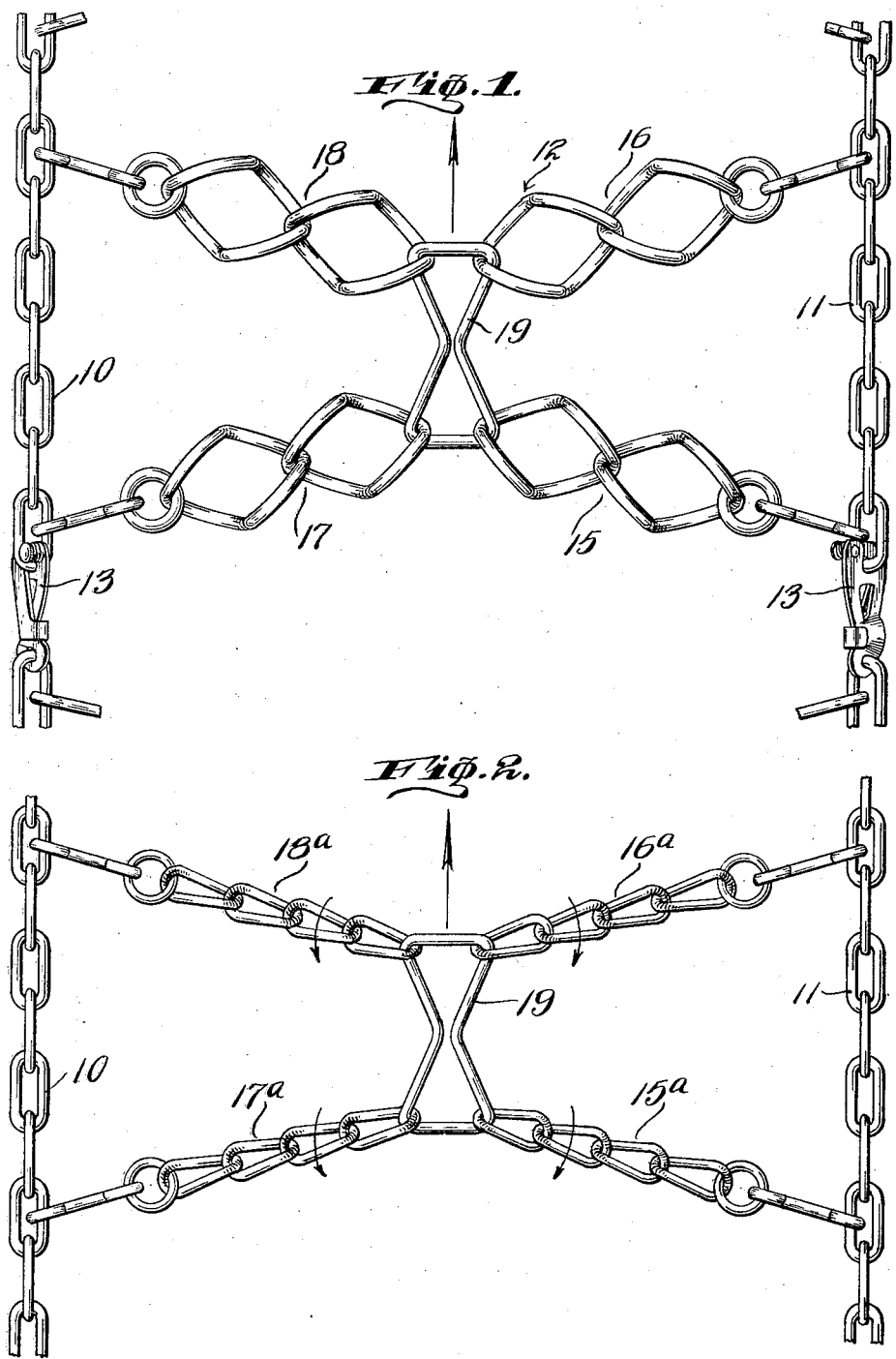

2,172,880

UNITED STATES PATENT OFFICE 2,172,880

TIRE CHAIN

George Small Schmidt, York, Pa., assignor to American Chain & Cable Company, Inc., New York, N. Y., a corporation of New York Application October 14, 1937, Serial No. 168,858

5 Claims. (Cl. 152—239)

The present invention relates to anti-skid tire chain assemblies of the type comprising a pair of side chains adapted to be disposed respectively at opposite sides of the tire with their ends connected together to form closed rings, the side chains being connected at intervals by cross chains arranged in sets having the form of the letter X.

An object of the invention is to prevent the cross chains from twisting in service thereby virtually shortening the cross chains and embedding the cross chain links into the tire. Such embedment of the links not only causes injury to the tire but also reduces the amount of projection of the links from the surface of the tire thereby reducing their tractive effect.

The invention is applicable to cross chains having twisted links generally and for purposes of description has been shown in connection with links of high and wide transverse tread, such, for example, as employed on farm tractor wheels to dig into loose soil or deep mud, and also in connection with curb links of the usual construction. In United States Patent No. 2,053,047, granted to J. R. Reyburn, September 1, 1936, for instance, there is disclosed an anti-skid chain with X type sets of cross chains embodying such links, and the four members of each set radiate from a central connecting link. It has been found that with tire chains of this type there is a tendency for the members on one side of the connecting link to twist thereby effectively shortening the cross chain sets. This action is particularly marked in cross chains employing such large widely spread twisted links and the reason why the members of each set on one side of the connecting link twist so readily is that the links project considerably from the surface of the tire and are subjected on one side to the drag of the tire and on the other or outer side to the drag of the road and no provision is included to prevent such twisting. Such twist of the members of each set is prevented or at least retarded on the opposite side of the tire because since all of the links are twisted in the same sense, the links on one side of the central connecting link are stopped by engagement with said central link while those on the other side are free to turn through a considerable angle before they are arrested by such central link. In ordinary cross chains employing curb links with the cross chains arranged in X type sets the cross chain links project a shorter distance from the tire, and the curb links are broader than they are deep so that they offer considerable resistance to the forces tending to roll them over in service. This invention, however, is applicable to cross chains comprising such curb links.

The main object of my invention is to prevent or limit twisting of the cross chain members on each side of the thread and I accomplish this by reversing the twist of the links at one side of the central connecting link with respect to those at the other side of the central connecting link and by extending the inner end of the inner link obliquely through the central connecting link. The tire chain assembly is preferably provided with means which will identify the direction in which the assembly should be applied to the wheel, and the user is then instructed to apply the anti-skid assembly in this selected position so that there will be substantially no twisting of the cross chain members when the vehicle is traveling in a forward direction. Of course, the members will twist when the vehicle is traveling in the opposite direction but the vehicle is not so apt to be run in reverse for any extended length as it is in forward direction. This invention is also applicable to unit chains as is apparent.

Other objects and advantages of my invention will appear in the following description of a preferred embodiment and thereafter the novelty and scope of the invention will be pointed out in the claims.

In the accompanying drawing;

Fig. 1 shows a top plan view of a portion of a tire chain of one form of link, embodying my invention, and Fig. 2 shows a similar view of a tire chain of curb-links, embodying my invention.

The chain disclosed in Figure 1 for purposes of illustration comprises side chains 10 and 11 of the usual form and construction connected by a series of cross chains generally indicated at 12 of general X-type, as disclosed. The ends of the side chains may be connected by a common form of fastener 13 in the usual manner. An arrow indicates the direction of travel of the vehicle to which the chain is attached.

As shown, each of the cross chain sections consists of four chain lengths or members 15, 16, 17 and 18 arranged like the letter X and connected to a central link 19 of substantially hour-glass form. In other words, the central link is so shaped as to provide four lobe portions each of which is engaged by a chain member. The outer ends of the chain members are secured to the side chains. The chain members 15 and 16 on the right hand side of the central link comprise links twisted in the same direction, each chain member comprising left hand twisted links which interlock against rolling and intertwining in a counter-clockwise direction as viewed from the right of Fig. 1. The inner end of the inner link in its normal position extends obliquely through and with respect to the central link to limit counter-clockwise rolling of the inner link and the chain member. This construction effectively prevents shortening of these chain members with the result that the links are not pressed into the material of the tire and project outwardly in all cases to provide for effective traction in loose soil or the like. As the chain members are not shortened by the limited rolling action it is obvious that the side chains are not unduly tensioned and that the fastener 13 even if of the inextensible type may be readily opened to remove the chain from the tire.

As disclosed in the drawing the chain members 17 and 18 on the left or opposite side of the central link 19 comprise links twisted in the opposite sense from those in the right hand side, that is, right hand twisted links, whereby the rolling of the links in a counter-clockwise movement is effectively limited by the engagement of the links with each other and the engagement of the inner link with the central link 19. The twist of the links is so chosen as to prevent intertwining of the links and shortening of the chain members under forward tractive effort.

An important feature of the invention carried out in connection with links of the general type disclosed in Fig. 1 is limiting the rotation of the links whereby the projecting portions of the links will effectively dig into loose soil and by their snow-shoe operation act as outwardly extending plate like cleats the use of which has been found undesirable on some surfaces.

In Fig. 2, the invention is disclosed in connection with chain members 15a, 16a, 17a and 18a comprising curb links, the straight arrow indicating the direction of travel of the vehicle and other arrows curved about links of the chain sections indicating the rolling action under tractive effort. This figure clearly shows that the rolling and intertwining of the links with the objectionable resultant tension on the chain members and side chains is eliminated by this invention when carried out in connection with any form of links having a tendency to roll, intertwine and shorten under tractive effort.

An important feature of the invention in connection with either type of link disclosed or with links of any type which may be twisted or rolled to shorten the cross connected tread chains and side chains consists in the effective prevention of the shortening of the cross chain sections during tractive action with the result that the chain sections will not be subjected to undue strains that the links will not be drawn into the tire to reduce their effectiveness, and which insures that no undue tension will be placed on the side chains with the result that the tire chain may move about the tread of the tire to prevent undue wear of the tire and that the fastener 13 may be readily opened for releasing the chain from the tire. The links are therefore free to slip back and forth on the tire as they engage the road and release, and in addition they will depress into the tire as they engage the road and upon release move outwardly from the tire.

While a preferred embodiment of the invention has been shown and described in conection with chain members comprising different types of links, it will be understood that it is to be taken as illustrative and not limitative and that the rght is reserved to make various changes in form, construction and arrangement of parts without departing from the spirit and scope of the invention as set forth in the claims.

What I claim is:

1. A cross tread member comprising a plurality of chain sections on each side of and connected together at the center of the tread, the chain sections on each side of the center of the tread consisting of loop like traction links of the same twist and of an opposite twist from that of the links of the chain sections on the other side.

2. A cross tread member comprising chain sections on one side of the center of the tread consisting of loop like traction links of one twist and chain sections on the other side consisting of loop like traction links of the opposite twist, and means for limiting the rotational movement of said links in the same direction.

3. A cross tread member comprising chain sections on one side of the center of the tread consisting of loop like traction links of one twist and chain sections on the other side consisting of loop like traction links of the opposite twist, and means connecting said chain sections together at the center of the tread and limiting their rotational movement in the same direction.

4. A cross chain for a tire comprising a plurality of loop like traction links on each side of the center of the tread, each link being twisted substantially 180° and having its side strands widely spaced and being of many times greater height than the thickness of the link material, at least one link on each side of the tread limiting the rotational movement of an adjacent link in a direction contrarywise to the direction of forward rotation of the tire, and means for limiting the rotational movement of said first mentioned links in said first mentioned direction.

5. An anti-skid device for tires comprising transversely extending chain sections on each side of the center of the tread, connected together at the center of the tread, all of the chain sections on each side of the center of the tread consisting of loop-like links of the same twist and of an opposite twist from that of the links of the chain sections on the other side of the center of the tread.

GEORGE SMALL SCHMIDT.